UNITED STATES PATENT OFFICE.

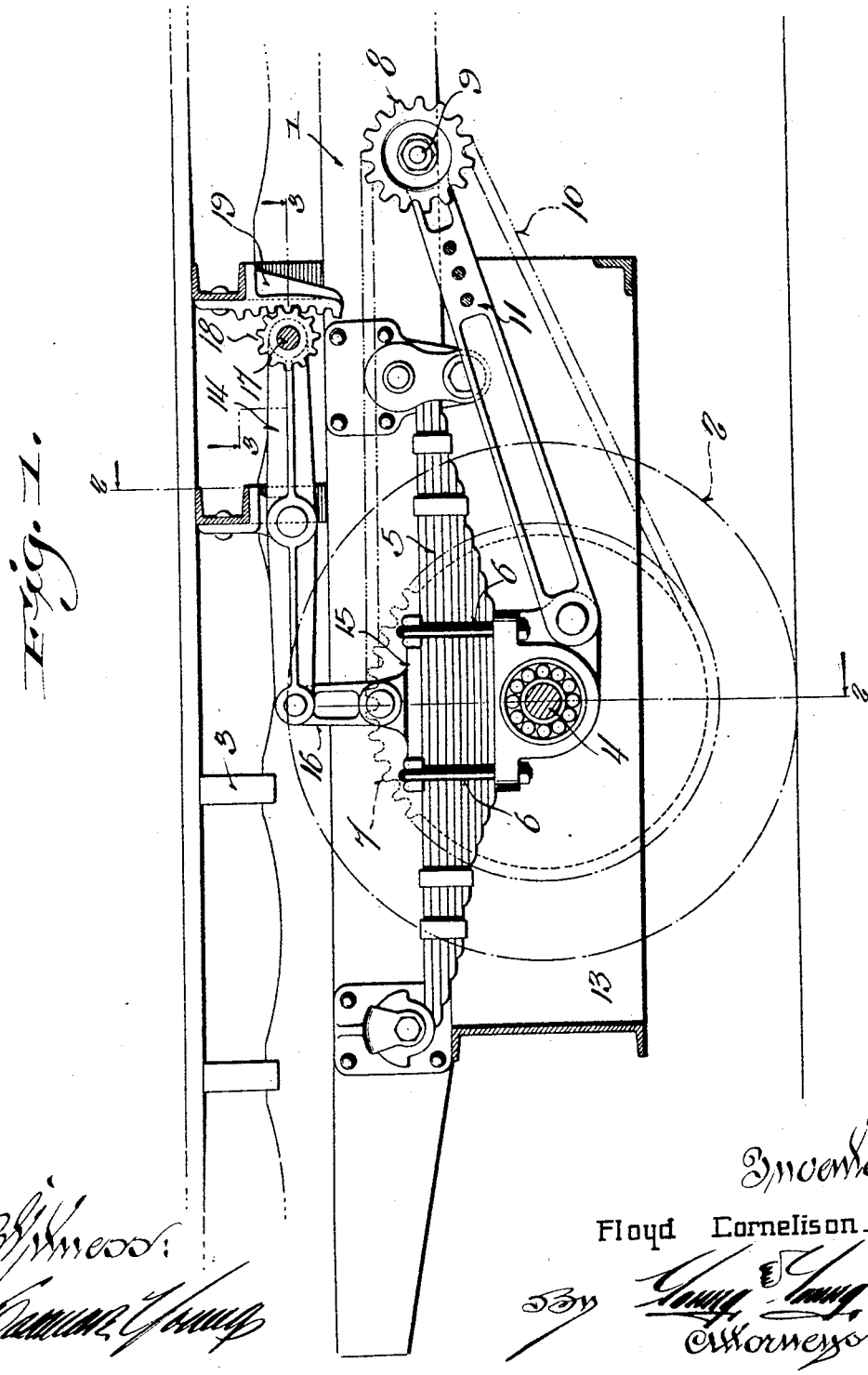

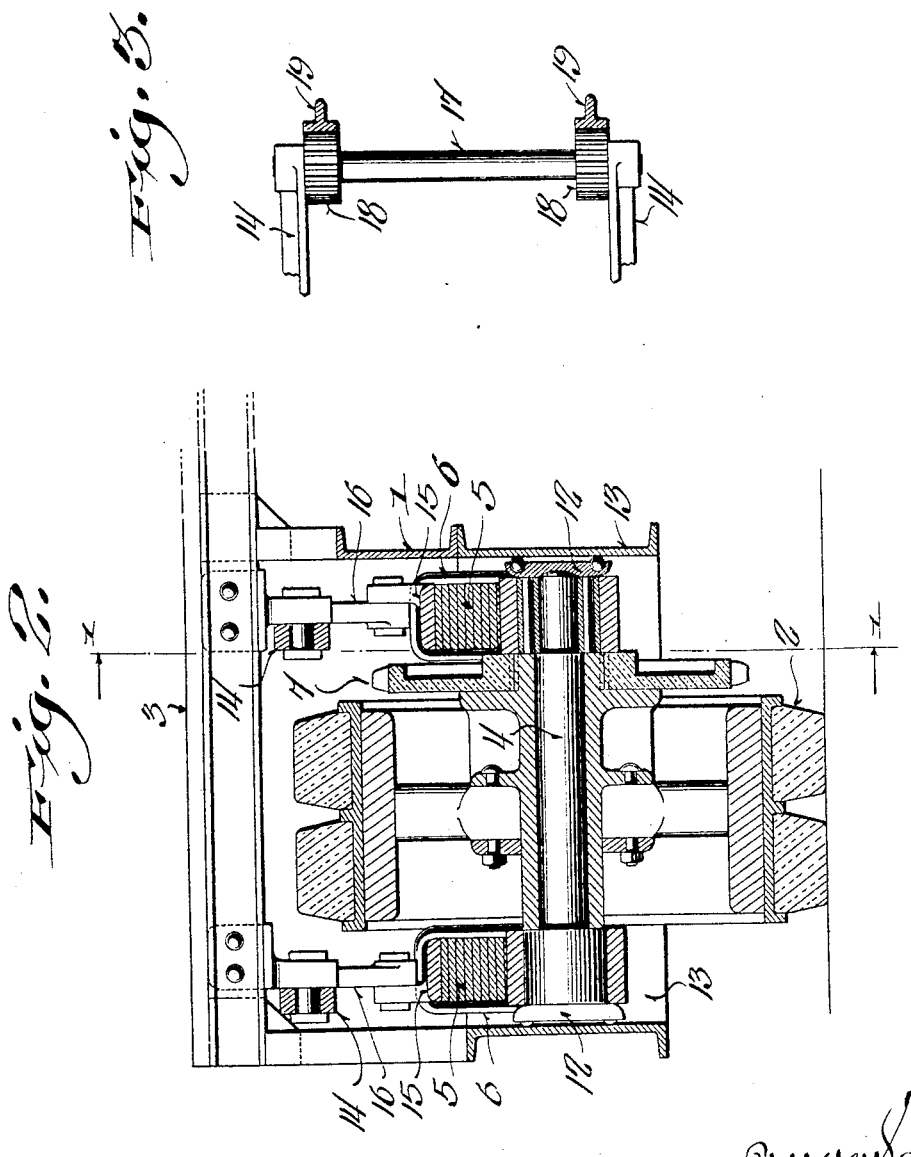

FLOYD CORNELISON, OF MILWAUKEE, WISCONSIN.

VEHICLE SUSPENSION MEANS.

1,397,922.  Specification of Letters Patent.  Patented Nov. 22, 1921.

Application filed August 30, 1920. Serial No. 406,914.

*To all whom it may concern:*

Be it known that I, FLOYD CORNELISON, a citizen of the United States, and resident of Milwaukee, in the county of Milwaukee and State of Wisconsin, have invented certain new and useful Improvements in Vehicle Suspension Means; and I do hereby declare that the following is a full, clear, and exact description thereof.

My invention pertains to new and useful improvements in suspension means for vehicles and is primarily adapted for use on self-propelled vehicles, such as motor trucks, tractors and the like.

In chain driven vehicles it is difficult, or nearly impossible, to retain the driven gears or sprockets which are carried by the vehicle drive wheels in alinement with the drive gears or sprockets disposed on the frame of the vehicle. In other words the ordinary spring suspension means permit the wheel carrying axle to have a considerable freedom of movement with respect to the vehicle frame, and as a result the driving power of the chains is decreased.

In view of this disadvantage which is prevalent in practically all chain driven vehicles, it is the primary object of this invention to provide means which will tend to eliminate tilting of the axle with respect to the vehicle frame and retain these parts in such relation that the driving mechanism will be correctly alined under practically all conditions.

A further object of the invention is to provide a vehicle having each of its drive wheels independently suspended upon an individual axle.

With these general objects in view the invention consists in the novel features of construction, combination and arrangement of parts which will be hereinafter more particularly described and claimed.

In the accompanying drawings:

Figure 1 represents a longitudinal sectional view taken approximately on the plane of the line 1—1 of Fig. 2.

Fig. 2 is a vertical transverse sectional view on the plane of the line 2—2 of Fig. 1.

Fig. 3 is a detail horizontal section on the plane of the line 3—3 of Fig. 1.

Referring more particularly to the drawings, it will be seen that the reference character 1 denotes a vehicle frame supported by wheels 2 and in turn carrying a suitable body structure 3. In the present instance each of the drive wheels is carried on an individual axle 4 which is suspended at its opposite ends by leaf springs 5. The opposite ends of these springs are shackled or otherwise connected with side bars of the frame 1, and the axle 4 which is carried thereby has its opposite ends clipped thereto as at 6.

Each drive wheel has a driven gear or sprocket 7 fixed thereto and adapted to coöperate with a gear or sprocket 8, mounted as is customary on the transverse drive shaft 9 journally mounted in the frame 1. A sprocket chain 10 connects the gears 7 and 8 whereby the wheels 2 are individually driven from the same source of power. As is frequently customary longitudinal strain on the wheel springs 5 and the shackles thereof is eliminated by the provision of brace links 11 which are pivoted to the bearings of the axle 4 and to the frame 1 adjacent the shaft 9.

As hereinbefore mentioned each of the shafts 4 is of such a length as to carry only one of the wheels 2 and is suspended at its opposite ends by means of leaf springs 5. End thrust on short shafts of this nature are taken up by the provisions of end thrust bearings 12, said bearings being carried by the opposite ends of the shaft 4 and engaged with the side walls of a frame casing 13, the same being carried by and suspended from the frame 1. As shown in Fig. 1 this frame casing 13 has its lower edge disposed below the axis of the wheel 2, and thus partly houses the wheel suspension means and a portion of the wheel itself.

The tilting of an axle 4 is prevented to a large extent, or altogether, by levers 14 pivoted intermediate their ends on the frame 1 and loosely and pivotally connected at one end with each of the upper spring plates 15 by links 16. The opposite ends of the levers 14 are connected together by a shaft 17, the latter having a pair of pinions 18 fixed thereto, one being disposed adjacent each of the levers 14. A pair of spaced stationary racks 19 are mounted upon the frame 1 in position to be engaged by the pinions 18 as most clearly shown in Fig. 3. When a vehicle having a wheel and suspension means of this nature is operated and there is a tendency of the axle 4 to tilt with respect to the frame 1, it is obvious that the levers 14 will be rocked on their pivots, but in opposite directions so that the tendency of one of the pinions 18 to rotate the shaft 17 to one direction is overcome by the action of the other pinion 18 in exerting its force to rotate such shaft in an opposite direction. In view of the fact that the actions of the pinions 18 and the racks 19 tend to offset each other, the axle 4 will be retained practically parallel with the frame 1 at all times. Therefore inasmuch as the axle 4 is not tilted, the sprocket or gear 7 is retained in alinement with the gear 8.

I claim:

1. In a vehicle, in combination, a stub axle, a cushioned suspension means for the axle, a wheel mounted on the axle, a compensating means on the axle at each side of the wheel, one of said means being operated in a manner the reverse of the other means when the axle tends to tilt, whereby the action of one of said means will counterbalance the other.

2. In a vehicle, in combination, a wheel axle, a cushioned suspension means for the axle, a wheel mounted on the axle, a lever connected with one end of the axle, a shaft carried by the lever, a pinion on the shaft, a stationary rack having the pinion meshed therewith, there being a tendency of the shaft to be rotated by the pinion upon tilting of the axle, and means connected with the other end portion of the axle and with the shaft for resisting movement of the latter by the pinion.

3. In a vehicle, in combination, a wheel axle, a cushioned suspension means for the axle, a wheel mounted on the axle, a lever connected with one end of the axle, a shaft carried by the lever, a pinion on the shaft, a stationary rack having the pinion meshed therewith, there being a tendency of the shaft to be rotated by the pinion upon tilting of the axle, a similar lever connected with the other end of the axle and with said shaft, a second pinion on the shaft, and a second stationary rack having the second pinion meshed therewith, the second pinion and rack tending to counteract the force exerted on the shaft by the first mentioned rack and pinion whereby to retain the axle in normal position.

In testimony that I claim the foregoing I have hereunto set my hand at Milwaukee, in the county of Milwaukee and State of Wisconsin.

FLOYD CORNELISON.